Aug. 19, 1952          A. D. COHEN          2,607,518
UNDERSLUNG AUTOMOBILE CARRIER
Filed May 18, 1949          3 Sheets-Sheet 1
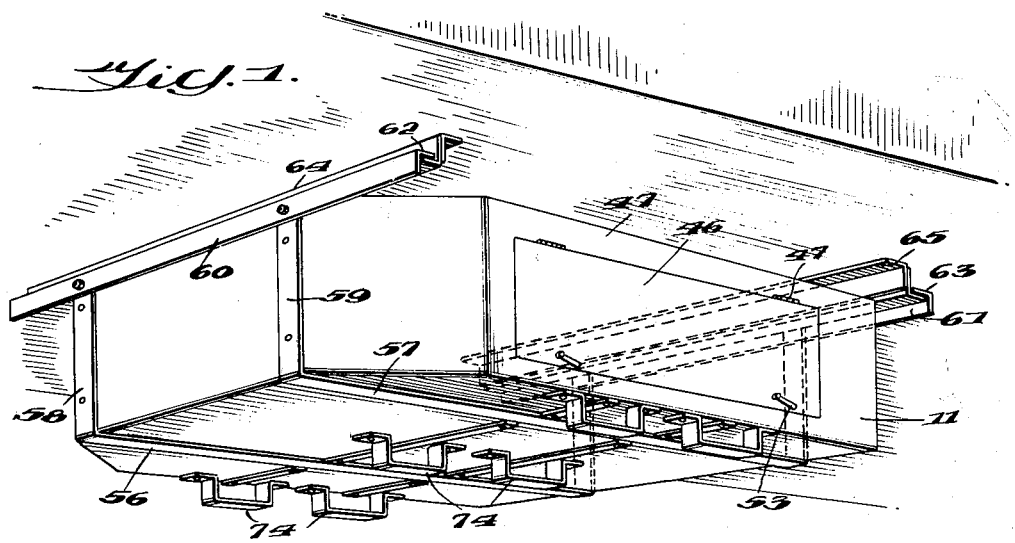
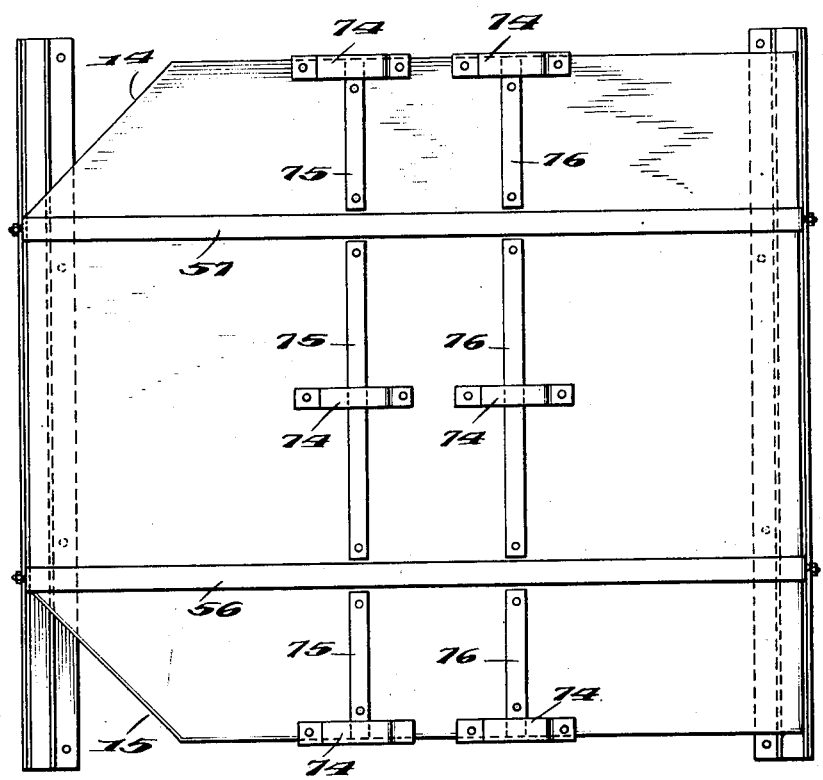
Inventor
ARNOLD D. COHEN,
ATTORNEYS

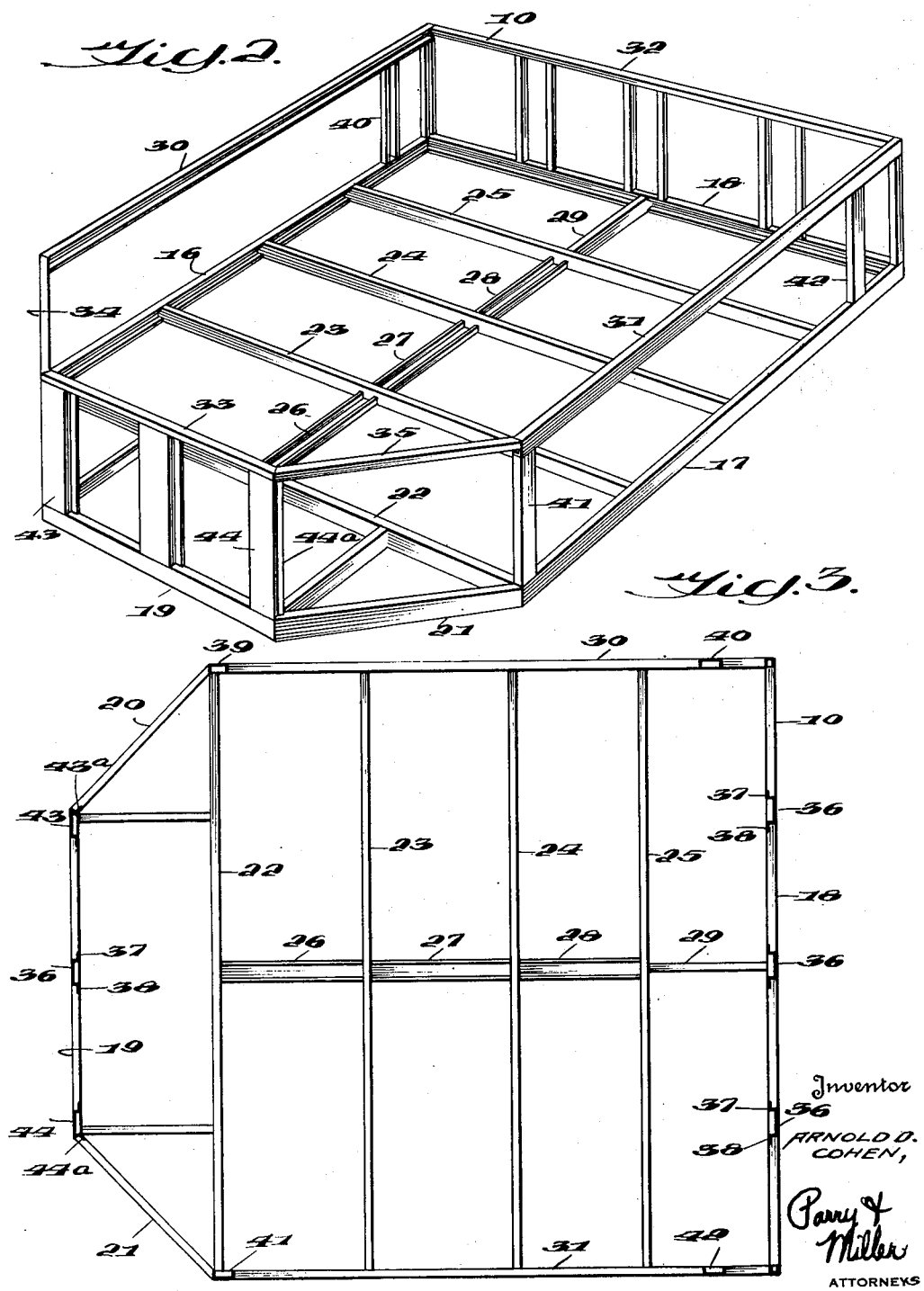

Aug. 19, 1952 A. D. COHEN 2,607,518
UNDERSLUNG AUTOMOBILE CARRIER
Filed May 18, 1949 3 Sheets-Sheet 3
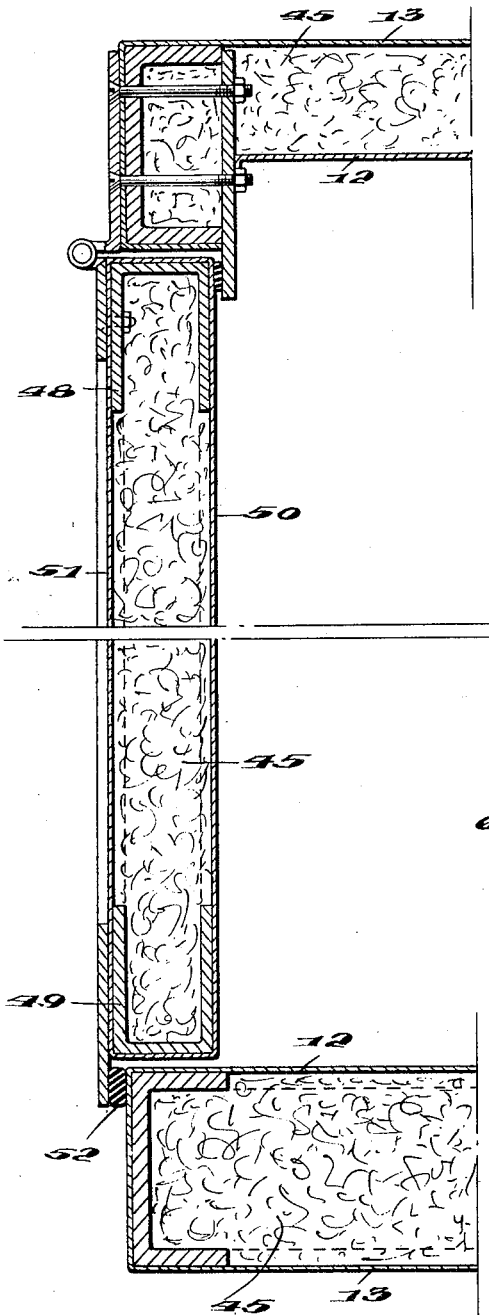
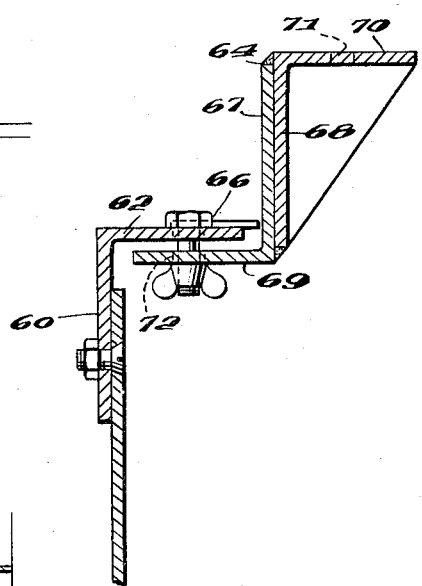

Patented Aug. 19, 1952

2,607,518

UNITED STATES PATENT OFFICE 2,607,518

UNDERSLUNG AUTOMOBILE CARRIER

Arnold D. Cohen, Merion Township, Pa., assignor to Carry Cool Container Corporation, Philadelphia, Pa., a corporation of Pennsylvania Application May 18, 1949, Serial No. 93,933

1 Claim. (Cl. 224—42.41)

This invention relates to a container for storing and transporting articles of food and similar perishable items and more particularly to a portable insulated container adapted to be removably attached to the underbody of a trailer truck.

A primary object of the invention is the provision of a portable container for storing and transporting perishable goods, such as food and the like, which is of simple but rugged construction and which is designed to prevent spoilage of the contents over extended periods of time.

Another object of the invention is the provision of a portable insulated container for food and other items, susceptible to being adversely affected by extremes of temperature such as summer heat, which may be removably attached to the underbody of a trailer truck or the like and which, when so attached, is easily accessible for loading and unloading from either or both sides.

Still another object of the invention is the provision of a portable insulated container for goods of a perishable nature such as food stuffs and the like which is adapted to be suspended from the underside of standard trailer bodies and which is shaped forwardly thereof to decrease wind resistance and deflect splash back of mud and snow.

A further object of the invention is the provision of a portable insulated container for food and the like adapted to be suspended from the underside of a trailer body which is constructed to offset heat reflected from roads and highways.

A still further object of the invention is the provision of a portable insulated food container which is accessible from both sides thereof for loading or unloading.

Another object of the invention is the provision of a portable insulated container for food stuffs and the like which can be easily adjusted to fit the underbodies of different types of trailer trucks.

Another object of the invention is the provision of a portable insulated container which may be readily picked up by a fork truck from either side thereof without tipping or shifting and without damage to the container bottom.

These and other objects and advantages of the invention will be apparent to persons skilled in the art from a consideration of the attached drawings and annexed specification illustrating and describing a preferred embodiment of the invention.

In the drawings:

Fig. 1 is a perspective view showing the device mounted in position beneath the body of a trailer truck;

Fig. 2 is a perspective view of the structural frame;

Fig. 3 is a horizontal cross-sectional view of the structural frame taken intermediate the height thereof and looking downwardly;

Fig. 4 is a vertical transverse sectional view through one of the doors and associated parts of the device;

Fig. 5 is a transverse sectional view through the Z-bar and angle; and,

Fig. 6 is a bottom view of the container.

The container according to the present invention comprises a portable self-contained unit which is adapted to be suspended from the underside of standard and/or non-standard trailer bodies. Although particularly designed for such use other applications of a more general nature may occur to those skilled in the art and hence should be considered as falling within the scope of the invention.

The size of the unit may be varied to suit individual needs. However, it has been found that a container which is about 8' 0" long x 7' 0" wide x 1' 9" high is quite satisfactory both from the standpoint of carrying capacity and portability as well as from the standpoint of practicability in fitting and securing it beneath a trailer body.

Referring now to the drawings the portable insulated unit in accordance with this invention comprises a structural frame 10 having an elongated box-like shape covered inside and out with suitable material to form a closed container 11 having inner and outer spaced walls 12 and 13. The forward end of the container 11 which is the end normally positioned directly behind the drive wheels of a truck when the unit is mounted beneath a trailer body has the corners cut off at about 45 degrees, as shown at 14 and 15, to reduce the front surface thereof and deflect splash back of water, mud and snow. Thus the front end of the container is somewhat shorter than the rear end and the sides of the container adjacent the front end slope inwardly thereto in converging relationship to form a trapezoidal shaped end section.

The structural frame 10 is preferably made of extruded and fabricated sections of aluminum welded together to form a light but strong and durable construction. The bottom of the frame is formed of the side members 16 and 17, end members 18 and 19, and diagonal members 20 and 21. These are preferably of extruded aluminum U-shaped in cross-sectional shape for added strength and welded together at their ends to form the framework for the bottom of the container. Cross members 22, 23, 24, and 25 of similar construction and shape span the bottom of the container and are connected at their ends to the side members 16 and 17. These further strengthen and stiffen the structure and assist in supporting the contents of the container when loaded. Additional strength is afforded by the longitudinal members 26, 27, 28 and 29 which are secured between the cross members 22, 23, 24 and 25 and between the cross member 25 and the end member 18.

The top portion of the structural frame is formed by the side members 30 and 31, the end members 32 and 33, and the diagonal members 34 and 35. These are connected together at their ends, as by welding, to form a framework having the same shape as the lower framework above described. The individual frame members of the upper framework, with the exception of the members 30 and 31, may be of lighter construction than the corresponding frame members of the lower section since they are not required to carry as great a load.

The upper and lower framework sections are held in spaced relation by a series of uprights located at the corners and at selected intermediate portions of the frames. The uprights 36 disposed at intermediate portions of the ends of the frames are preferably U-shaped in cross-section and provided with laterally extending flanges 37 and 38 against which the inner covering of the container is secured. The uprights 39, 40, 41 and 42 located at the sides of the framework form in conjunction with the side members 16, 17, 30 and 31 the framework for supporting the side doors. The uprights 43 and 44 disposed at the front corners are shaped similarly to the uprights 36 except that the laterally extending flanges 43a and 44a are arranged diagonally to conform to the cut off portions of the container.

The outer wall 13 of the container preferably comprises sheet aluminum approximately .040 gauge thickness stretched over the structural frame 10 and fastened by means of rivets. The inner wall 12 is likewise preferably formed of sheet aluminum of about .038 gauge thickness and may, if desired, be secured to the inner sides of the structural frame members in any suitable manner or alternatively may merely rest thereagainst. In the construction shown the inner and outer walls of the sides and top of the container are spaced apart about an inch and lined with insulating material 45 such as spun glass, rock wool, or the like. The inner and outer walls of the bottom of the container are spaced apart a greater distance to receive a thicker layer of insulating material, for example, about a 2 inch layer, so as to offset the heat which is reflected from roads and highways.

The container 11 is loaded and unloaded through almost full length doors 46 which are hinged adjacent the top at both sides of the container as at 47 and when opened may be held in open position by any suitable means such as a rod attached to the inner surface of the doors. Each of the doors 46 have upper and lower frame members 48 and 49 suitably fastened at their ends to similarly shaped end members to form a rectangular frame having secured thereto inner and outer spaced walls 50 and 51. The doors 46 are insulated similarly to the walls of the container and are held in closed position against sealing gaskets 52 by suitable latches 53 which may desirably be standard refrigerator door latches.

The container 11 is suspended from the underside of a trailer body by U-shaped supporting brackets 56 and 57 which are bent around the container and fastened thereto in any suitable manner. These brackets preferably run along the underside of the container lengthwise thereof with the leg portions 58 and 59 extending upwardly at the ends of the container. At the top of the leg portions 58 and 59 are secured the transverse members 60 and 61 which are preferably structural steel angles arranged with the legs 62 and 63 thereof turned inwardly toward the center of the unit and projecting above the top of the unit about an inch. The structural steel angles 60 and 61 are designed for attachment to the Z-bar sections 64 and 65 and for this purpose are provided with openings 66 which are preferably elongated to permit adjustability and easy assembly. Each of the Z-bar sections 64 and 65 preferably comprise a pair of angle irons having their long legs 67 and 68 secured together as by welding or the like and their short legs 69 and 70 apertured as at 71 and 72 for attachment to the underbody of the trailer truck and the legs 62 and 63 of the angle irons 60 and 61 respectively. The apertures 71 are likewise preferably elongated for adjustability and easy assembly. If desired the long legs 67 and 68 of the Z-bars may be secured together by pin and slot connections so that the vertical dimension of the Z-bars may be varied to allow for difference in design of the underside of trailer bodies.

The unit is usually brought to and taken from the trailer by a fork truck whose regular 36 inch long blades are lengthened by attaching to the blades 6 inch channels flat side up to form a support for the unit. These channel extensions are about 6 feet long and are readily removable. To prevent the unit from tipping or shifting when being moved by the fork truck structural steel brackets 74 are attached to the underside of the unit at both edges and the center so that the unit can be lifted from either side. Six of the brackets 74 are desirably used and are preferably disposed so that they can be secured to portions of the structural frame 10. In addition to their function in connection with the use of a fork truck the brackets 74 also serve as legs or supports and thus prevent wear of the outer wall covering 13 by sliding or other contact with a supporting surface.

The underside of the unit that comes in contact with the 6 inch channel extensions of a fork truck is provided with flat steel bars 75 and 76 to act as runners and also prevent the aluminum covering from being worn or ripped by the sliding action of the fork extensions whenever the unit is moved. These bars may be secured in position in any suitable manner as by rivets, welding, or the like.

In use the unit of this invention may be loaded and unloaded while secured in position beneath the body of a trailer truck or alternatively may be removed from the trailer truck and carried to any suitable point for loading and/or unloading. In removing the unit from its mounting, a fork truck with 6 inch channel extensions on the fork is positioned adjacent the side of a trailer with the channel extensions inserted through the steel brackets 74 and beneath the bottom of the unit. The bolts connecting the legs 62 and 63 of angles 60 and 61 with the legs 69 of the Z-bars 64 and 65 are then removed by unscrewing the nuts holding them in place which for convenience may be wing nuts removable by hand. The fork truck is then backed off to remove the unit and carry it to the desired point where it is deposited to rest on the brackets 74. When the unit is again ready to be mounted the fork truck picks it up, carries it to the trailer truck, and holds it in position beneath the body thereof until it is again secured in place.

Various modifications of the invention described and illustrated will most likely occur to those skilled in the art to which the invention relates and may be made without departing from the spirit of the invention, the scope of which is indicated in the attached claim.

I claim:

A portable device for food and the like comprising a box-like container and means for securing said container to the underbody of a trailer truck comprising a pair of U-shaped strap members secured to the bottom and ends of said container, crossbars secured to the tops of said U-shaped strap members, and a pair of Z-bars each comprising a pair of angle irons adjustably secured together along one of the legs thereof, the other leg of one angle iron of each pair being secured to the underbody of a trailer truck, and the other leg of the other angle iron of each pair being secured to said crossbars.

ARNOLD D. COHEN.

REFERENCES CITED

The following references are of record in the file of this patent:

UNITED STATES PATENTS

| Number | Name | Date |
| --- | --- | --- |
| 571,945 | Ertheiler | Nov. 24, 1896 |
| 584,167 | Shanklin | June 6, 1897 |
| 746,597 | Sochurek | Dec. 8, 1903 |
| 1,158,394 | Skelton | Oct. 26, 1915 |
| 1,453,362 | Loveland | May 1, 1923 |
| 1,605,901 | O'Neil | Nov. 2, 1926 |
| 1,618,542 | Ludwig | Feb. 22, 1927 |
| 1,653,978 | Ballreich | Dec. 27, 1927 |
| 2,034,834 | Robinson | Mar. 24, 1936 |
| 2,164,317 | Fitch | July 4, 1939 |
| 2,290,715 | Shanahan et al. | July 21, 1942 |
| 2,424,434 | Bucknell | July 22, 1947 |
| 2,475,903 | Klas | July 12, 1949 |

FOREIGN PATENTS

| Number | Country | Date |
| --- | --- | --- |
| 401,743 | Great Britain | Nov. 20, 1933 |
| 623,024 | Great Britain | May 11, 1949 |